United States Patent
Wang et al.

(10) Patent No.: US 9,657,718 B2
(45) Date of Patent: May 23, 2017

(54) EXTREMUM SEEKING-BASED CONTROL METHOD FOR MAXIMUM OUTPUT TRACKING OF A WIND TURBINE GENERATOR

(71) Applicants: STATE GRID TIANJIN ELECTRIC POWER COMPANY, Tianjin (CN); STATE GRID CORPORATION OF CHINA, Beijing (CN)

(72) Inventors: Xudong Wang, Tianjin (CN); Tao Liu, Tianjin (CN); Jikeng Lin, Tianjin (CN); Guangyu Wu, Tianjin (CN)

(73) Assignees: STATE GRID TIANJIN ELECTRIC POWER COMPANY (CN); STATE GRID CORPORATION OF CHINA (CN)

( * ) Notice: Subject to any disclaimer, the term of this patent is extended or adjusted under 35 U.S.C. 154(b) by 0 days.

(21) Appl. No.: 14/646,570

(22) PCT Filed: May 30, 2013

(86) PCT No.: PCT/CN2013/076514
§ 371 (c)(1),
(2) Date: May 21, 2015

(87) PCT Pub. No.: WO2014/089955
PCT Pub. Date: Jun. 19, 2014

(65) Prior Publication Data
US 2015/0292485 A1    Oct. 15, 2015

(30) Foreign Application Priority Data
Dec. 12, 2012 (CN) .......................... 2012 1 0540286

(51) Int. Cl.
F03D 9/00 (2016.01)
F03D 7/00 (2006.01)
F03D 7/04 (2006.01)

(52) U.S. Cl.
CPC ............... *F03D 9/002* (2013.01); *F03D 7/00* (2013.01); *F03D 7/045* (2013.01);
(Continued)

(58) Field of Classification Search
CPC . F03D 9/002; F03D 7/045; F03D 7/00; Y02E 10/723; F05B 2270/103; F05B 2270/20
See application file for complete search history.

(56) References Cited

U.S. PATENT DOCUMENTS

2009/0218819 A1    9/2009 Miller et al.
2013/0300115 A1*  11/2013 Seem .................. H02P 9/04
290/44

(Continued)

FOREIGN PATENT DOCUMENTS

| CN | 101639038 A | 2/2010 |
| CN | 102477943 A | 5/2012 |
| CN | 102705158 A | 10/2012 |

OTHER PUBLICATIONS

International Search Report for application No. PCT/CN2013/076514 mailed Sep. 12, 2013.

*Primary Examiner* — Nathan L Laughlin
(74) *Attorney, Agent, or Firm* — Hauptman Ham, LLP

(57) ABSTRACT

The present invention discloses an extremum seeking-based control method for maximum output tracking of a wind turbine generator, mainly comprising three steps of first closed-loop feedback, second closed-loop feedback, and third closed-loop feedback. The method for resisting mechanical fatigue of a double-fed variable speed constant frequency wind turbine generator by controlling mechanical torque while capturing maximum wind energy provided in (Continued)

the present invention is applied to a double-fed variable speed constant frequency wind turbine system by improving the control based on sliding mode extremum seeking with the following effects that, with regard to the maximum wind energy tracking effect, the rotating speed can be quickly adjusted to keep the tip speed ratio $\lambda$ as its optimum value after the wind speed changes, so that the wind energy utilization coefficient is restored to the maximum value.

4 Claims, 1 Drawing Sheet

(52) U.S. Cl.
CPC ..... *F05B 2270/103* (2013.01); *F05B 2270/20* (2013.01); *Y02E 10/723* (2013.01)

(56) References Cited

U.S. PATENT DOCUMENTS

2014/0356161 A1* 12/2014 Creaby ................ F03D 7/0224 416/1
2015/0267686 A1* 9/2015 Kjær .................... F03D 7/0224 290/44

\* cited by examiner

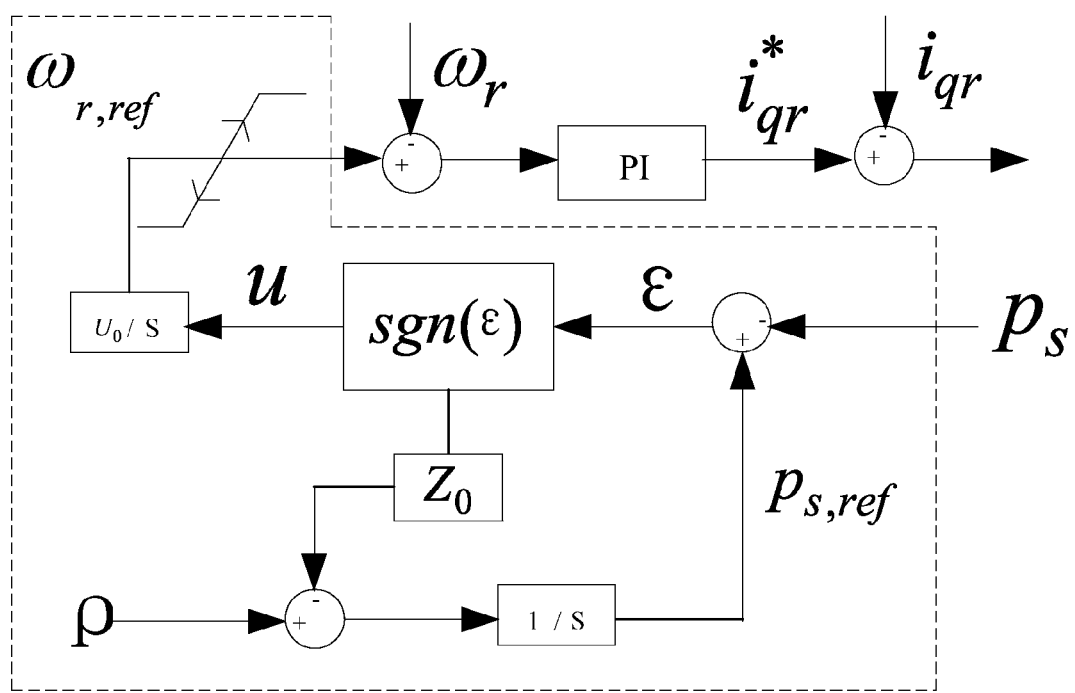

EXTREMUM SEEKING-BASED CONTROL METHOD FOR MAXIMUM OUTPUT TRACKING OF A WIND TURBINE GENERATOR

CROSS REFERENCE TO RELATED APPLICATION

This application claims the priority of Chinese Patent Application No. 201210540286.3, filed on Dec. 12, 2012 in the SIPO (The State Intellectual Property Office of People's Republic of China). Further, this application is the National Phase application of International Application No. PCT/CN2013/076514 filed May 30, 2013, which designates the United States and was published in Chinese.

TECHNICAL FIELD

The present invention belongs to the field of new energy development and especially relates to an extremum seeking-based control method for maximum output tracking of a wind turbine generator.

BACKGROUND

A variable speed constant frequency wind turbine generator performs maximum wind energy tracking while operating with a rated wind speed, captures the maximum wind energy from natural wind and converts it into electricity and transfers into a power grid. In order to capture the maximum wind energy, the rotating speed $\omega_r$ must be adjusted to the optimum value $\omega^*_r$ when the wind speed changes, and the optimal tip speed ratio $\lambda_{opt}$ is kept, that is, the process of maximum wind energy tracking can be construed as a rotating speed adjusting process of a wind turbine. The effect of maximum wind energy tracking depends on rotating speed adjusting performance. In a turbulent wind field, $\lambda_{opt}$ is kept constant only if the torque of a generator changes fast. However, if the mechanical torque changes too fast, vibration of the system is enhanced, increasing the risk of fatigue damage and reducing service life of the system. Therefore, during maximum wind energy tracking, consideration must be given to both mechanical load of the wind turbine generator and control of the mechanical torque to reduce rate of change of the mechanical torque when the wind speed changes. The traditional maximum wind energy tracking method comprises an optimal tip speed ratio method, a hill climbing method and a power feedback method. Using the optimal tip speed ratio method to perform the maximum wind energy tracking, the optimal rotating speed value corresponding to the optimal tip speed ratio is calculated, as the reference instruction of the control system, from the measured wind speed and the rotating speed of the generator. This method has simple control structure and is easy to implement, but the disadvantage is that it requires real-time accurate wind speed measurement, which is hard to realize in the actual wind field. The hill climbing method judges the variation trend of the rotating speed by measuring the rotating speed and the output power of the wind turbine in real time and according to their change of gradient, and controls the operating point of the unit to approach the maximum power point. This method avoids the problem of wind speed measurement, but it requires measuring the gradient of the output power and the rotating speed of the wind turbine in real time, and a gradient sensor makes louder noise and is unstable at a high frequency. Moreover, the time for measuring and judging will affect the accuracy of algorithm. The power feedback method controls the electromagnetic torque of a double-fed motor by controlling the output active power of the double-fed motor, thereby indirectly controlling the rotating speed of the unit. This method can efficiently avoid fluctuation of the output power and also does not require detection of the wind speed. The disadvantage of this method is that it requires simulation and experiment to obtain the power-wind speed curve with different curves for different wind wheels. For the disadvantages of the traditional control method, some of the control methods in the modern control theory are introduced into the maximum wind energy tracking. Predictive Control: wind energy prediction is performed for maximum wind energy, the wind speed is predicted by using a support vector regression (SVR) algorithm, and the predicted wind speed is input into a wind energy converting system to calculate the optimal rotating sped value at the wind speed; this method does not require wind speed measurement and the disadvantage is that the accuracy for wind energy prediction is not high; Neural Network Control: The WRBFN neural network is combined with the hill climbing algorithm, and a controller is designed by using a particle swarm optimization algorithm; this method efficiently solves the shortage of the hill climbing algorithm and is only suitable for a permanent magnet motor but not in a double-fed motor, i.e., the method has a small range of application; Nonlinear Control: The sliding mode variable structure control is applied to wind power generation, a switching surface is defined as the power relative error, and different sliding mode control rates are respectively employed to normal and stall modes of the generator so as to achieve the aim of no error tracking and maximum wind energy capturing; this method has fast response speed, but the theory is based on and is too dependent on the accurate mathematic model of the object; Fuzzy Control: The maximum wind energy tracking is performed by using the fuzzy control, which overcomes the disadvantage of the traditional control of being dependent on the accurate mathematic model of the controlled object and has a problem that the designed controller has low accuracy; and Adaptive Control: The extremum seeking control based on perturbation is applied to the maximum wind energy tracking in wind power, and the change of the wind speed is processed in the wind energy converting system to obtain an excitation signal so as to obtain the optimal top speed ratio, thereby reaching the maximum capturing rate for the wind energy; this method does not require establishment of an accurate model for the controlled object, and it has fast control speed and high accuracy, but the disadvantage of the method is the same as that of the optimal tip speed ratio method, i.e., it requires real-time accurate measurement of the wind speed. The sliding mode variable structure control is combined with the extremum seeking control. Based on the sliding mode extremum seeking control, the control method has advantages of simple structure and unique input variable.

SUMMARY OF THE INVENTION

The present invention is aimed to using a sliding mode extremum seeking-based control method, and is intended to solve the problems of the current method for maximum output tracking of a wind turbine generator that the capability of resisting mechanical fatigue of the system is enhanced by changing the structure or material of a mechanical part and thus the complexity and cost of the system structure are increased.

The invention is aimed to provide a sliding mode extremum seeking-based control method for maximum output tracking of a wind turbine generator, the extremum seeking-based control method comprising the following steps:

First closed-loop feedback for generating a feedback value of an output active power $p_s$: The specific signaling process comprises comparing the active power $p_s$ output by a double-fed motor and a power reference value $p_{s,ref}$, delivering the difference $\epsilon$ to a sign function $sgn(\epsilon)$, producing a sliding mode action when $sgn(\epsilon)$ changes, delivering the information to a module $v_0/s$ after multiplying by a constant u, thus obtaining a reference value $\omega_{r,ref}$ of the rotating speed, and obtaining the active power $p_s$ according to a WCES image and feeding the active power $p_s$ back to the power reference value $p_{s,ref}$, thereby forming power closed-loop feedback;

Second closed-loop feedback for generating a feedback closed-loop system of the difference $\epsilon$ between an output value and a reference value: The specific signaling process comprises comparing the sign function $sgn(\epsilon)$ with a preset value $\rho$ after being magnified by a factor of $Z_0$, processing the difference in a 1/s step to obtain a power reference value $p_{s,ref}$, comparing the power reference value $p_{s,ref}$ with the active power $p_s$ to obtain the difference $\epsilon$, and then delivering the difference to the sign function $sgn(\epsilon)$ to form a feedback closed-loop system;

Third closed-loop feedback for implementing control of rate of change of $\omega_r$ and in turn for limiting $\Delta T_m$ within (0, $\Delta T^*_m$): The specific implementation method comprises comparing the active power $p_s$ with the power reference value $p_{s,ref}$ to obtain the difference $\epsilon$, then delivering the difference to the sign function $sgn(\epsilon)$; on one hand, comparing the sign function $sgn(\epsilon)$ with a preset value $\rho$ after being magnified by a factor of $Z_0$, processing the difference in a 1/s step to obtain the power reference value $p_{s,ref}$, and further comparing with the active power $p_s$ to form closed-loop feedback; and on the other hand, magnifying the sign function $sgn(\epsilon)$ by a factor of U to obtain $U_0/s$, and thus obtaining the reference value $\omega_{r,ref}$ of the rotating speed, comparing $\omega_{r,ref}$ with $\omega_r$, processing the difference in a PI proportional differential step to obtain a standard rotor quadrature axis component $$\left|\frac{d\omega_{r,ref}}{dt}\right| = i^*_{qr},$$

and then further comparing with a preset value $i_{qr}$ to determine a reasonable upper limit $\Delta\omega^*_r$, thereby implementing control of the rate of change of $\omega$, and in turn limiting $\Delta T_m$ within (0, $\Delta T^*_m$).

Further, the first closed-loop feedback mainly consists of a WCES image module, comparison of the active power $p_s$ and the power reference value $p_{s,ref}$, the sign function $sgn(\epsilon)$ and a $v_0/s$ module.

Further, the second closed-loop feedback mainly consists of the sign function $sgn(\epsilon)$, a magnifying module $Z_0$, a preset value $\rho$ comparison step and a 1/s step.

Further, the third closed-loop feedback mainly consists of a comparison step of $\omega_r$ and the reference value, a PI proportional differential step, and a comparison step of $i_{qr}$ and the preset value.

The Present Invention has the Following Advantages:

The present invention provides a method for resisting mechanical fatigue of a double-fed variable speed constant frequency wind turbine generator by controlling mechanical torque while capturing maximum wind energy. The method is applied to a double-fed variable speed constant frequency wind turbine system by improving the control based on sliding mode extremum seeking with the following effects that, with regard to the maximum wind energy tracking effect, the rotating speed can be quickly adjusted to keep the tip speed ratio $\lambda$ as its optimum value after the wind speed changes, so that the wind energy utilization coefficient $C_p$ is restored to the maximum value; and with regard to mechanical torque control, $T_m$ can be varied stably without any oscillation after the wind speed changes, thereby achieving the aim of reducing mechanical fatigue. The method both can guarantee that the double-fed variable speed constant frequency wind turbine generator can capture maximum wind energy while operating with a rated wind speed, and can guarantee that the control of mechanical torque is realized by processing a control signal without changing the structure or material of a mechanical part, thereby achieving the aim of reducing the mechanical load.

BRIEF DESCRIPTION OF THE DRAWINGS

FIG. 1 is a structure diagram of an extremum seeking-based control method for maximum output tracking of a wind turbine generator provided in an embodiment of the present invention.

DETAILED DESCRIPTION

For better understanding of the purpose, technical solution and advantage of the present invention, the invention is further illustrated in detail below in conjunction with the accompanying drawings and embodiments. It should be understood that the specific embodiments described here are only for explanation and not for limiting the scope of the present invention.

The inventive embodiment provides an extremum seeking-based control method for maximum output tracking of a wind turbine generator, comprising the following steps:

First closed-loop feedback for generating a feedback value of an output active power $p_s$; The specific signaling process comprises comparing the active power $p_s$ output by a double-fed motor and a power reference value $p_{s,ref}$, delivering the difference $\epsilon$ to a sign function $sgn(\epsilon)$, producing a sliding mode action when $sgn(\epsilon)$ changes, delivering the information to a module $v_0/s$ after multiplying by a constant u, thus obtaining a reference value $\omega_{r,ref}$ of the rotating speed, and obtaining the active power $p_s$ according to a WCES image and feeding the active power $p_s$ back to the power reference value $p_{s,ref}$, thereby forming power closed-loop feedback;

Second closed-loop feedback for generating a feedback closed-loop system of the difference $\epsilon$ between an output value and a reference value; The specific signaling process comprises comparing the sign function $sgn(\epsilon)$ with a preset value $\rho$ after being magnified by a factor of $Z_0$, processing the difference in a 1/s step to obtain a power reference value $p_{s,ref}$, comparing the power reference value $p_{s,ref}$ with the active power $p_s$ to obtain the difference $\epsilon$, and then delivering the difference to the sign function $sgn(\epsilon)$ to form a feedback closed-loop system;

Third closed-loop feedback for implementing control of rate of change of $\omega_r$ and in turn for limiting $\Delta T_m$ within (0, $\Delta T^*_m$). The specific implementation method comprises comparing the active power $p_s$ with the power reference value $p_{s,ref}$ to obtain the difference $\epsilon$, then delivering the difference to the sign function $sgn(\epsilon)$; on one hand, comparing the sign function sgn(ε) with a preset value ρ after being magnified by a factor of $Z_0$, processing the difference in a 1/s step to obtain the power reference value $p_{s,ref}$, and further comparing with the active power $p_s$ to form closed-loop feedback; and on the other hand, magnifying the sign function sgn(ε) by a factor of U to obtain $U_0$/s, and thus obtaining the reference value $\omega_{r,ref}$ of the rotating speed, comparing $\omega_{r,ref}$ with $\omega_r$, processing the difference in a PI proportional differential step to obtain a standard rotor quadrature axis component $$\left|\frac{d\omega_{r,ref}}{dt}\right| = i_{qr}^*,$$

and then further comparing with a preset value $i_{qr}$ to determine a reasonable upper limit $\Delta\omega^*_r$, thereby implementing control of the rate of change of $\omega_r$ and in turn limiting $\Delta T_m$ within (0, $\Delta T^*_m$).

As a preferred solution of the inventive embodiment, the first closed-loop feedback mainly consists of a WCES image module, comparison of the active power $p_s$ and the power reference value $p_{s,ref}$, the sign function sgn(ε) and a $v_0$/s module.

As a preferred solution of the inventive embodiment, the second closed-loop feedback mainly consists of the sign function sgn(ε), a magnifying module $Z_0$, a preset value ρ comparison step and a 1/s step.

As a preferred solution of the inventive embodiment, the third closed-loop feedback mainly consists of a comparison step of $\omega_r$ and the reference value, a PI proportional differential step, and a comparison step of $i_{qr}$ and the preset value.

Referring to FIG. 1, the extremum seeking-based control method for maximum output tracking of a wind turbine generator of the inventive embodiment is further described in detail below.

As shown in FIG. 1, the principle of the extremum seeking-based control method for maximum output tracking of a wind turbine generator of the present invention is that the structure diagram mainly consists of double closed-loop feedback.

First closed-loop feedback, for generating a feedback value of an output active power $p_s$, comprising a WCES image module, comparison of the active power $p_s$ and the power reference value $p_{s,ref}$, the sign function sgn(ε) and a $v_0$/s module; the specific signaling process comprises comparing the active power $p_s$ output by a double-fed motor and a power reference value $p_{s,ref}$, delivering the difference ε to a sign function sgn(ε), producing a sliding mode action when sgn(ε) changes, delivering the information to a module $v_0$/s after multiplying by a constant u, thus obtaining a reference value $\omega_{r,ref}$ of the rotating speed, and obtaining the active power $p_s$ according to a WCES image and feeding the active power $p_s$ back to the power reference value $p_{s,ref}$, thereby forming power closed-loop feedback;

Second closed-loop feedback, for generating a feedback closed-loop system of the difference ε between an output value and a reference value, comprising the sign function sgn(ε), a magnifying module $Z_0$, a preset value ρ comparison step and a 1/s step; The specific signaling process comprises comparing the sign function sgn(ε) with a preset value ρ after being magnified by a factor of $Z_0$, processing the difference in a 1/s step to obtain a power reference value $p_{s,ref}$, comparing the power reference value $p_{s,ref}$ with the active power $p_s$ to obtain the difference ε, and then delivering the difference to the sign function sgn(ε) to form a feedback closed-loop system;

The present invention further comprises a comparison step of $\omega_r$ and the reference value, a PI proportional differential step, and a comparison step of $i_{qr}$ and the preset value for implementing control of rate of change of $\omega_r$ and in turn for limiting $\Delta T_m$ within (0, $\Delta T^*_m$). The specific implementation method comprises comparing the active power $p_s$ with the power reference value $p_{s,ref}$ to obtain the difference ε, then delivering the difference to the sign function sgn(ε); on one hand, comparing the sign function sgn(ε) with a preset value ρ after being magnified by a factor of $Z_0$, processing the difference in a 1/s step to obtain the power reference value $p_{s,ref}$, and further comparing with the active power $p_s$ to form closed-loop feedback; and on the other hand, magnifying the sign function sgn(ε) by a factor of U to obtain $U_0$/s, and thus obtaining the reference value $\omega_{r,ref}$ of the rotating speed, comparing $\omega_{r,ref}$ with $\omega_r$, processing the difference in a PI proportional differential step to obtain a standard rotor quadrature axis component $$\left|\frac{d\omega_{r,ref}}{dt}\right| = i_{qr}^*,$$

and then further comparing with a preset value $i_{qr}$ to determine a reasonable upper limit $\Delta\omega^*_r$, thereby implementing control of the rate of change of $\omega_r$ and in turn limiting $\Delta T_m$ within (0, $\Delta T^*_m$).

The above are only the preferred embodiments of the present invention and not intended to limit the present invention. Any modifications, equivalent replacements, improvements and the like within the spirit and principle of the present invention shall fall within the scope of protection of the present invention.

The invention claimed is:
1. An extremum seeking-based control method for maximum output tracking of a wind turbine generator, wherein the method is a sliding mode extremum seeking-based control method for realizing maximum output tracking of the wind turbine generator, and the method comprises:
   first step: comparing an active power $p_s$ output by a double-fed motor and a present power reference value $p_{s,ref}$, delivering a difference ε to a sign function when the

$$\text{sgn}(\varepsilon): a = \text{sgn}(\varepsilon) = \begin{cases} 1, & \varepsilon > 0 \\ 0, & \varepsilon = 0 \\ -1, & \varepsilon < 0 \end{cases},$$

when the sign function sgn(ε) changes, delivering a constant u to a module $U_0$/s by calculating $$\frac{dU_o}{dt} \cdot u,$$

wherein $U_0$ is a rated voltage of the double-fed motor, and t is time, then obtaining a reference value of rotating speed $\omega_{r,ref}$ and comparing the reference value of rotating speed $\omega_{r,ref}$ with a real-time value of rotating speed $\omega_r$, processing a difference of the $\omega_{r,ref}$ and the $\omega_r$ in a PI proportional differential step to obtain a standard rotor quadrature axis component $$\left|\frac{d\omega_{r,ref}}{dt}\right| = i_{qr}^*,$$

and then further comparing with a preset value $i_{qr}$ to determine an upper limit $\Delta\omega^*_r$ of variations to the real-time value of rotating speed $\omega_r$;

second step: when the sign function sgn($\epsilon$) in the first step changes, the constant u is compared with a preset value ρ after being magnified by a factor of $Z_0$, processing a difference in a 1/s step to obtain a new power reference value $p_{s,ref}$, then repeating the first step and obtaining a new upper limit $\Delta\omega^*_r$;

third step: converting the upper limit $\Delta\omega^*_r$ into a mechanical torque variation $\Delta T_m$, and in turn limiting $\Delta T_m$ within (0, $\Delta T^*_m$), and $\Delta T^*_m$ being a maximum variation of mechanical torque; and forth step: adjusting a rotating speed of the wind turbine generator based on the maximum variation of mechanical torque $\Delta T^*_m$.

2. The sliding mode extremum seeking-based control method for maximum output tracking of a wind turbine generator of claim 1, wherein the first step forms a first closed-loop feedback, and wherein the first closed-loop feedback comprises a WCES image module, comparison of the active power $p_s$ and the power reference value $p_{s,ref}$, the sign function sgn($\epsilon$) and the $U_0$/s module.

3. The sliding mode extremum seeking-based control method for maximum output tracking of a wind turbine generator of claim 1, wherein the second step forms a second closed-loop feedback, and wherein the second closed-loop feedback comprises the sign function sgn($\epsilon$), the magnifying module $Z_0$, the preset value ρ comparison step and the 1/s step.

4. The sliding mode extremum seeking-based control method for maximum output tracking of a wind turbine generator of claim 1, wherein the third step forms a third closed-loop feedback, and wherein the third closed-loop feedback comprises a comparison step of $\omega_r$ and the reference value, a PI proportional differential step, and a comparison step of $i_{qr}$ and a preset value.

* * * * *